May 2, 1950 R. G. LETOURNEAU 2,506,028
SPRING APPLIED ELECTROMAGNETICALLY RELEASED BRAKE
Filed Aug. 24, 1945 4 Sheets-Sheet 3

INVENTOR
R. G. LeTourneau
BY
ATTORNEYS

May 2, 1950  R. G. LETOURNEAU  2,506,028
SPRING APPLIED ELECTROMAGNETICALLY RELEASED BRAKE
Filed Aug. 24, 1945  4 Sheets-Sheet 4

INVENTOR.
R. G. LeTourneau
BY
*Webster & Webster*
ATTYS

Patented May 2, 1950

2,506,028

UNITED STATES PATENT OFFICE 2,506,028

SPRING APPLIED ELECTROMAGNETICALLY RELEASED BRAKE

Robert G. Le Tourneau, Peoria, Ill., assignor to R. G. Le Tourneau, Inc., Stockton, Calif., a corporation of California Application August 24, 1945, Serial No. 612,329

1 Claim. (Cl. 188—171)

This invention relates to, and it is an object to provide, an electric power unit or actuator of novel design; such electric power unit being adapted for commercial and industrial uses, such as the control or actuation of the moving parts of earth working scrapers, cranes, road graders, or the like.

Another object of the invention is to provide an electric power unit which comprises, in unitary, compact relation, a reversible electric motor, a reduction gear box at one end of the motor, and an electrically controlled brake at the other end of the motor; the brake being automatically released upon energization of the motor for rotation in either direction.

A further object of the invention is to provide an electric brake, as in the preceding paragraph, which is of simple and yet sturdy and practical construction; such brake being normally spring-engaged or set, and electrically released by an electromagnet associated therewith.

An additional object is to provide an electric power unit including novel circuit breaking means whereby the motor can be shut off and the brake automatically set upon the motor making a predetermined number of revolutions after starting. This feature is important as it provides automatic and desirable means to limit the extent of movement of a part to which the electric power unit is connected in actuating relation.

A further object of the invention is to provide an electric power unit which is exceedingly effective for the purposes for which it is designed.

These objects are accomplished by means of such structure and relative arrangement of parts as will fully appear by a perusal of the following specification and claim.

In the drawings similar characters of reference indicate corresponding parts in the several views.

Figure 1:
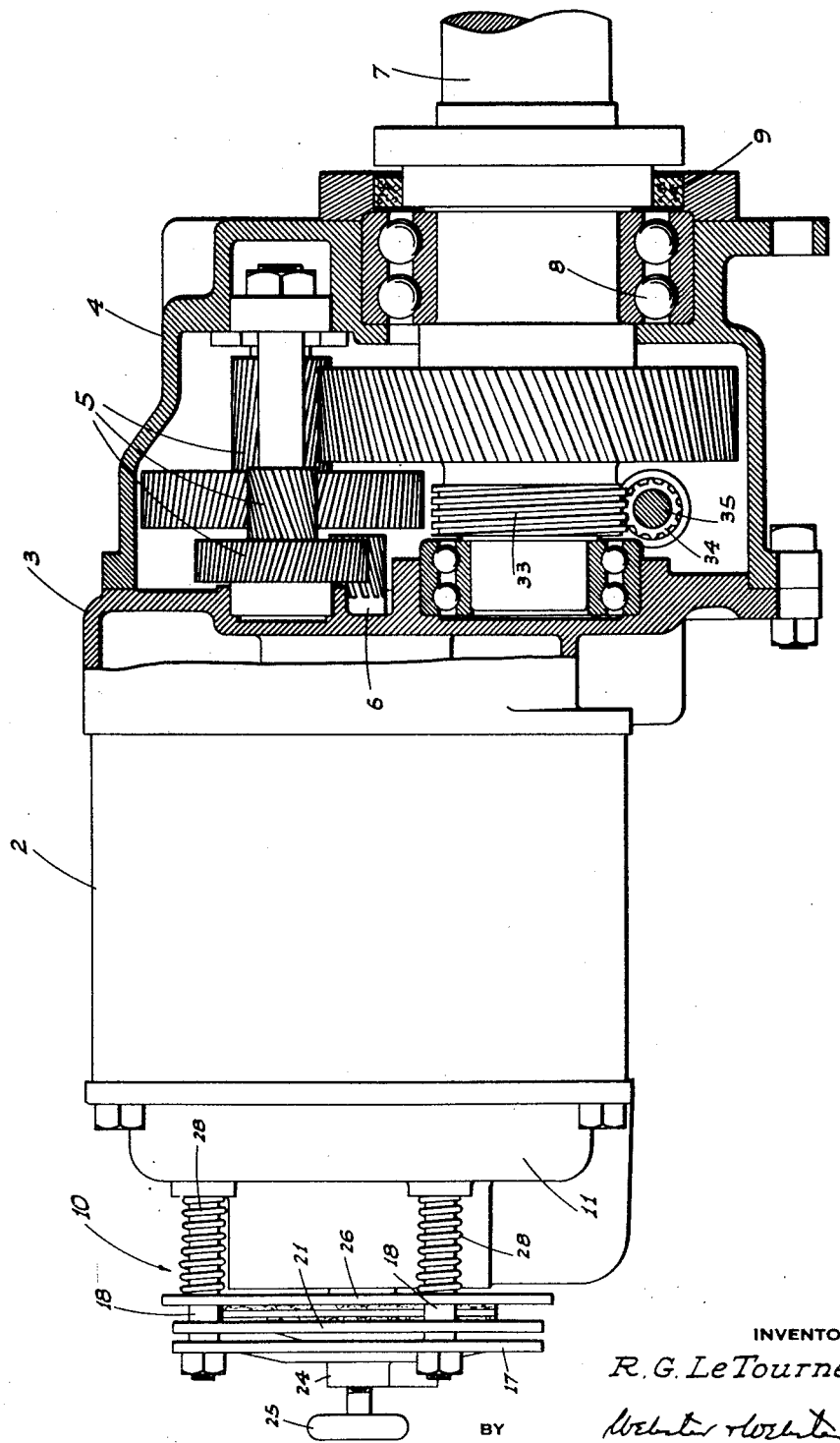
Figure 1 is a side elevation of the electric power unit; the reduction gear unit being shown in section.
Figure 2:
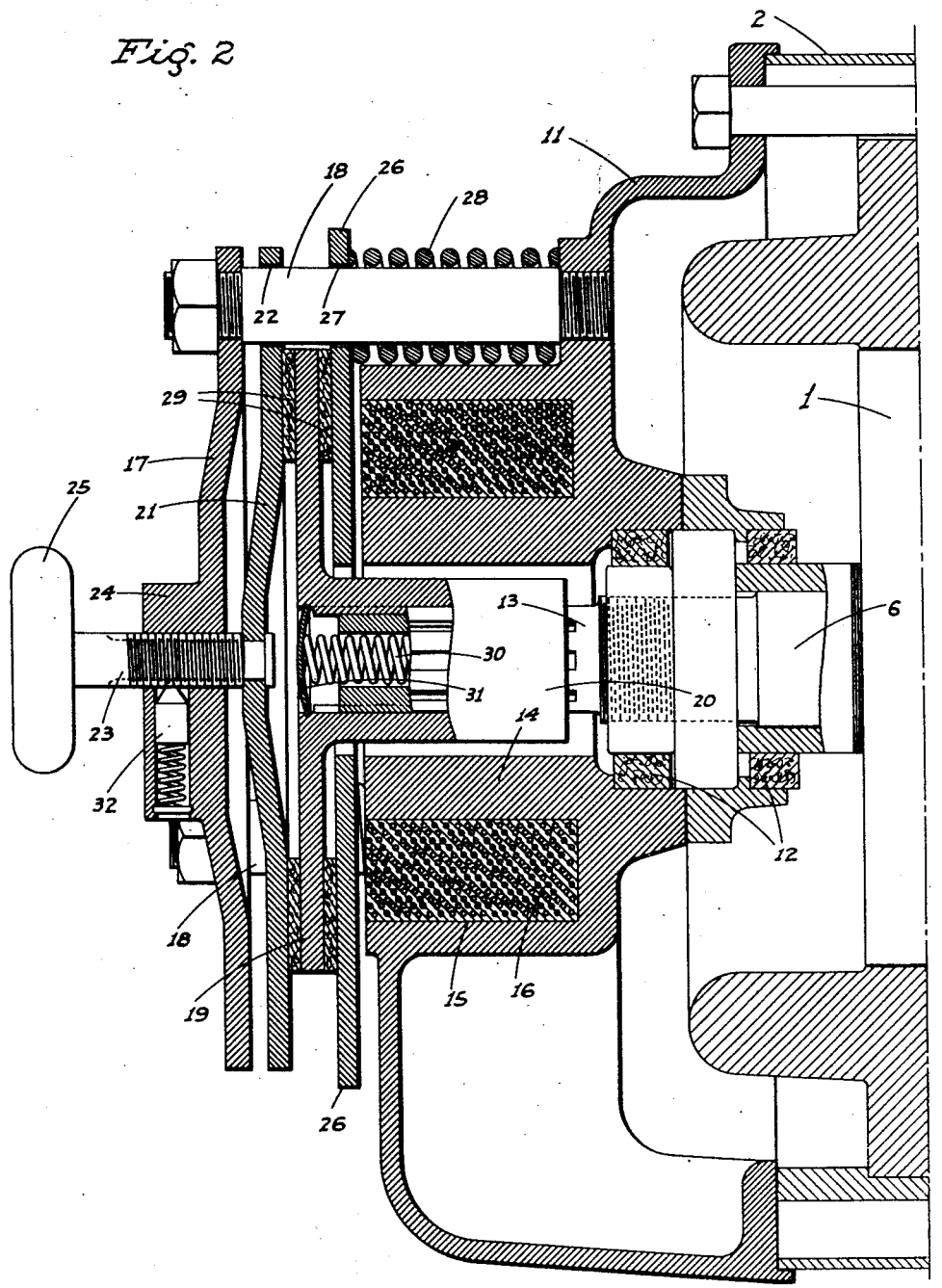
Figure 2 is an enlarged fragmentary sectional elevation of the electrically controlled brake unit and the adjacent end of the electric motor.

Referring now more particularly to the characters of reference on the drawings, the electric power unit includes a reversible electric motor, indicated at 1, disposed within a motor housing 2. At one end the motor housing 2 includes an end bell 3 formed as an inner end portion of an axially outwardly extending gear box 4; the latter housing a reduction gear train, indicated generally at 5. The motor shaft 6 drives the reduction gear train 5 and in turn the latter drives an output shaft 7 journaled in the gear box 4 in bearings 8, and projecting out of one end of said gear box through a seal 9. The output shaft 7 may be coupled, in any suitable manner, to the part to be actuated. For example, said output shaft 7 may be fitted with a cable drum having a cable leading from the drum to the movable part. This type of adaptation is illustrated in co-pending application, Serial No. 604,257, filed July 10, 1945, now U. S. Patent 2,477,811.

At the end of the motor opposite the reduction gear box 4 there is provided an electrically controlled brake unit 10 arranged, in the following manner, to normally brake the motor 1 against rotation:

At said end of the motor the same is formed with an end bell 11, through which the corresponding end of the motor shaft 6 projects through seals 12 as an extension 13. The end bell 11 is formed in concentric relation to the motor shaft extension 13 with an outwardly projecting neck 14 having an annular channel 15 formed therein, said channel opening outwardly and having a heavy-duty electro-magnet coil 16 seated therein.

A fixed annular head plate 17 is disposed in spaced relation outwardly of, but in generally concentric facing relation to, the outer end of the neck 14; said head plate 17 being supported from the end bell 11, at circumferentially spaced points, by fixed studs 18 disposed parallel to, but radially out from, the motor shaft extension 13.

Between the fixed head plate 17 and the electro-magnet coil 16 there is provided a brake assembly comprising the following:

A rotatable, intermediate brake disc 19 extends radially of the motor shaft extension 13 between the head plate 17 and coil 16; said intermediate brake disc including a hub 20 splined on the motor shaft extension 13 for sliding axially of the latter.

A non-rotatable, outer brake disc 21 is disposed between the intermediate brake disc 19 and the head plate 17, and is of somewhat greater diameter than the intermediate brake disc 19, whereby the studs 18 pass in relatively slidable relation through matching openings 22 in said outer brake disc, so that the latter is axially movable. Axial movement of the outer brake disc 21 is controlled by a brake adjustment screw 23 threaded through a hub 24 on the head plate 17; said brake adjustment screw 23 extending axially outwardly to a point beyond the hub 24 and there being fixed with a hand wheel 25.

A non-rotatable inner brake disc 26 is mounted for axial movement in a similar manner between the coil 16 and the intermediate brake disc 19; said inner brake disc 26 having matching openings 27 through which the studs 18 relatively slidably project, and a central opening for hub 20.

Heavy-duty compression springs 28 encircle the studs 18 and engage between the inner brake disc 26 and the adjacent portion of the end bell 11, said springs normally urging the inner brake disc 26 away from the coil 16, and clamping the intermediate brake disc 19 between said inner brake disc 26 and the outer brake disc 21. The intermediate brake disc 19 is formed on opposite faces with suitable brake lining 29. As the intermediate brake disc 19 is normally held against rotation by the thrust of the springs 28, the motor shaft extension 13 and the shaft 6, together with the reduction gear train 5 and output shaft 7, are all normally locked against rotation.

Figure 6:
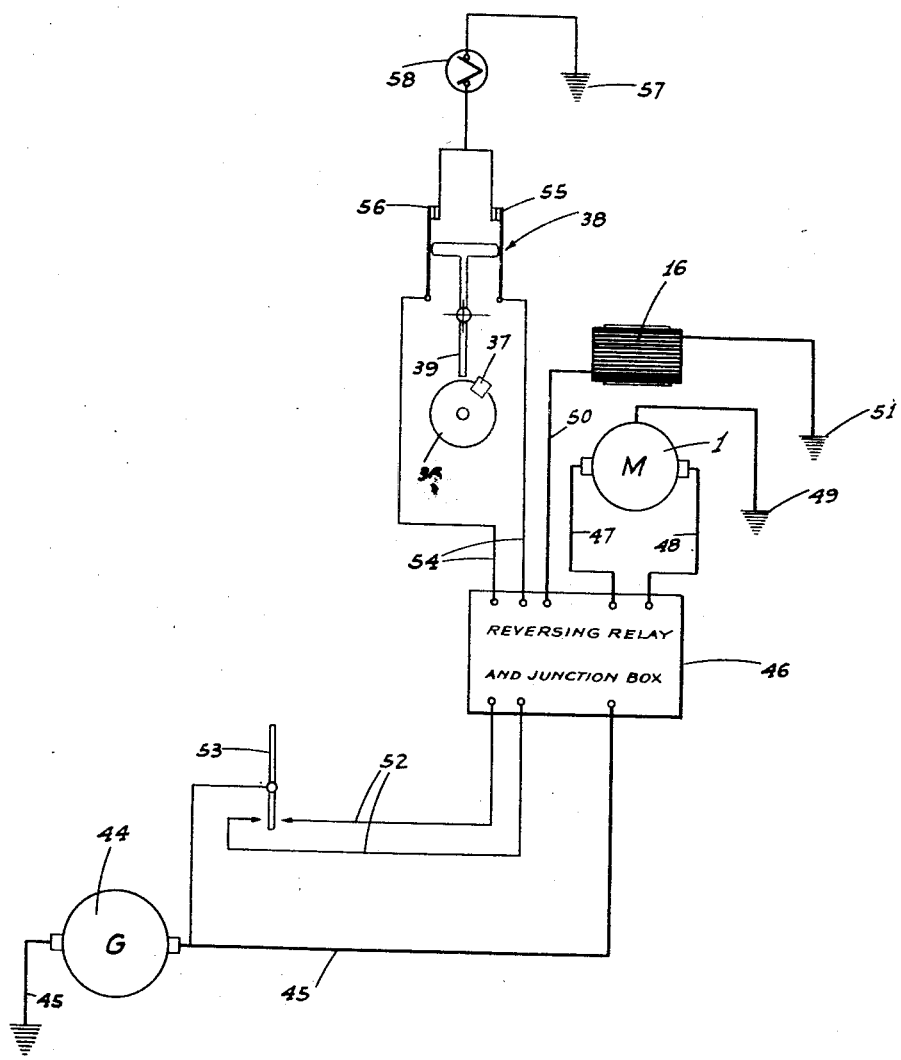
Figure 6 is a diagram of one form of circuit which may be used to control the electric power unit.

By means of a suitable circuit, an illustration of one form of which is shown in Fig. 6, and which will hereinafter be described, the reverisble electric motor 1 may be energized to rotate in one direction or the other. At the same time, and regardless of the direction of rotation of the reversible electric motor 1, the electro-magnet coil 16 is energized and the resulting electromagnetic force draws the inner brake disc 26 axially inwardly against the compression of springs 28 and away from the intermediate brake disc 19. When this occurs said intermediate brake 19 is released and it rotates freely with the motor shaft 6. When the motor 1 is deenergized the circuit to the coil 16 is automatically broken, whereupon the inner brake disc 26 is again urged axially outwardly by the springs 28, clamping the lined intermediate brake disc 19 between said inner brake disc 26 and the outer brake disc 21. This instantaneously stops the motor 1 and prevents any overrunning of the output shaft 7.

In order to prevent the intermediate brake disc 19 from becoming permanently magnetized by the coil 16, said intermediate brake disc 19 is of a non-magnetic material, such as an aluminum or brass alloy. This is important for the reason that if said intermediate brake disc 19 were of a magnetic material it would become permanently magnetized from the coil 16, with the result that said disc 19 would tend to follow the inner brake disc 26, and the brake could not ever be completely released.

As a further means to prevent such intermediate brake disc 19 from following the inner brake disc 26 to brake release position of the latter, and which might occur if the device were set in a vertical position with the brake uppermost, a compression spring 30 is engaged in a bore in the outer end of the motor extension shaft 13 and works against a head 31 in the adjacent end of the hub 20. The tension of this spring 30 would be insufficient to lift disc 19 into contact with the outer brake disc 21.

Adjustment of the above described brake assembly is accomplished through the medium of the brake adjustment screw 23 and the hand wheel 25 thereon. A spring-pressed pin 32 works against the adjustment screw 23 and normally maintains the latter against accidental rotation.

The electric power unit which is the subject of this invention also includes a novel circuit breaking means whereby the motor is shut off and the brake automatically set upon the motor making a predetermined number of revolutions after starting; such means comprising the following:

Within the gear box 4 the reduction gear train 5 includes a worm gear 33 on the output shaft 7, and a worm pinion 34 meshes with said worm gear 33 at the bottom; said pinion being fixed on a driven shaft 35 which extends through one side of the gear box 4 to a termination outwardly thereof.

Figure 4:
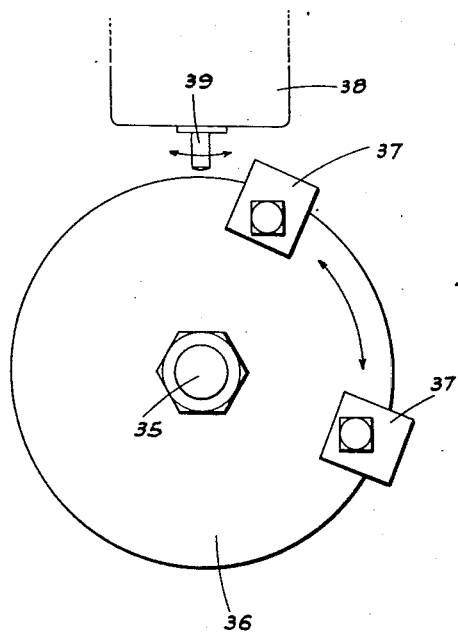
Figure 4 is an end elevation of one embodiment of the automatic circuit breaking unit.

At its outer end the shaft 35 has a disc 36 fixed thereon. In the embodiment of Fig. 4 the circuit breaking means includes one or more stops 37 circumferentially adjustably secured on the disc 36 and projecting radially outwardly therefrom. A single pole double throw switch 38 is disposed radially out from but adjacent the disc 36, and said switch includes a switch lever 39 movable in one direction to open the switch on one side, and movable in the other direction to open the switch on the other side, as indicated by the arrow in Fig. 4.

The stops are set on the disc 36 so as to engage and move the switch lever 39 upon a predetermined number of rotations of the shaft 7 in either direction from a given starting position.

Figure 3:
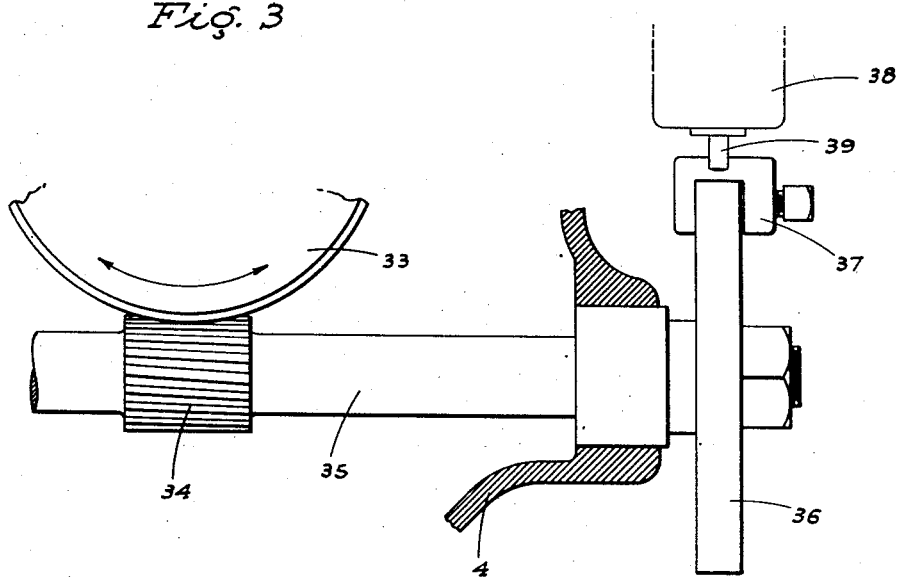
Figure 3 is an enlarged fragmentary cross section showing the drive shaft of the automatic circuit breaking unit.
Figure 5:
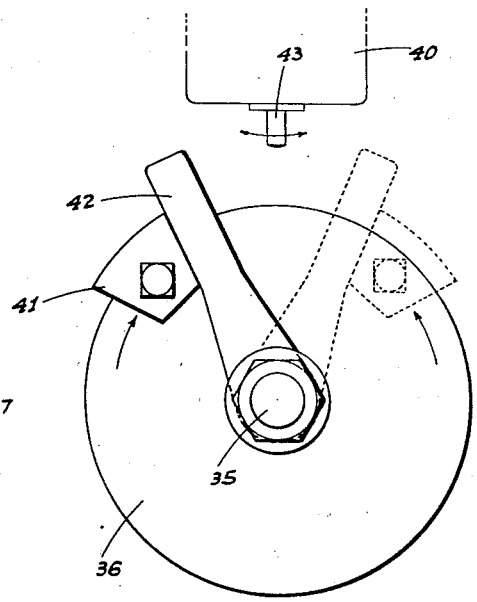
Figure 5 is an end elevation showing a modified embodiment of the automatic circuit breaking unit.

The embodiment of the circuit breaking means shown in Fig. 5 is similar to that described above in connection with Fig. 3, but here the disc and stop arrangement is such as to permit of more than one revolution of the disc 36 before the circuit is automatically broken. In this embodiment the switch 40, which corresponds to the switch 38 in Fig. 4, is spaced from the disc 36 out of the path of a circumferentially adjustable, laterally outwardly projecting stop 41. A finger 42 is swingably mounted on the shaft 35 outwardly of the disc 36 and projects across the path of rotation of the stop 41 to a termination at its outer end a sufficient distance to engage the switch lever 43, which has movement two ways, as indicated by the arrow, and in the same manner as the switch lever 39. When stop 41 is engaged with one side of finger 42 and is moving in a clockwise direction as shown in full line in Fig. 5, continued movement of the stop in said direction will cause the finger to trip switch lever 43. With a reverse movement of the disc and stop, it will be obvious that nearly two revolutions of the disc must take place before the stop will have engaged the finger on the opposite side and moved the same to a switch operating position, as indicated in dotted lines in Fig. 5. In this manner the circuit breaking means can be set to function only upon occurrence of more than a full revolution of the disc 36, and which may be desirable under conditions wherein the part to be moved by the electric power unit travels a substantially great distance.

The illustrative circuit shown diagrammatically in Fig. 6 comprises the following:

Current from a source such as a generator 44 feeds through a circuit 45 to a reversing relay 46 which feeds current, selectively, through wires 47 and 48 to the motor 1, the opposite side of the circuit of which is grounded, as at 49. The reversing relay 46 is also wired so that whenever the motor 1 is energized, i. e. for rotation in either direction, the electro-magnet coil 16 is likewise energized through a circuit including a feed wire 50 and a ground wire 51.

The reversing relay 46 is controlled so as to feed current to the motor 1 through either the wire 47 or 48, and simultaneously to the coil 16 through the wire 50, by a control circuit which includes separate wires 52 adapted to be selectively energized by an operator-controlled single pole double throw switch 53 connected to the generator on the side opposite the ground.

This control circuit is, however, subject to a sub-circuit which includes a pair of wires 54 which lead from the reversing relay to opposite contacts 55 and 56 of the switch 38, and which contacts are adapted to be broken separately, dependent upon the direction of swinging of the switch lever 39. On the side opposite the wires 54 the contacts 55 and 56 lead to a common ground 57, the lead between said contacts and the ground having a thermal motor protector 58 interposed therein. The arrangement is such that when either the contacts 55 or 56 are broken a corresponding side of the feed circuit of wires 47 and 48 to the motor 1 is simultaneously broken, along with the circuit to the coil 16, through the medium of instrumentalities within the reversing relay. Thus, when the stop means 37 on the disc 36, in the embodiment of Fig. 4, engage the switch lever 39 on one side or the other, resulting in opening of the contacts 55 or 56, depending on the direction of rotation of said disc 36, the motor 1 is immediately deenergized and the brake applied, causing instantaneous stoppage of rotation of the output shaft 7.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

An electrically controlled brake for an electric motor comprising in combination with said motor, a group of concentric brake discs supported coaxially with the motor shaft adjacent one end thereof, one disc including a hub slidably mounted on the motor shaft and rotatable therewith, said shaft terminating within the hub, a normally fixed non-rotatable disc on one side of the first disc and a floating non-rotatable disc on the opposite side of said first disc, yieldable means normally urging all of said discs into engagement with each other, electrically actuated means operative to cause relative separation of said first and third named discs, and yieldable means interposed between the motor shaft and the first named disc of sufficient tension to prevent the first named disc from dragging on the third disc as the latter is moved away from said first disc but insufficient to force the said first disc into frictional contact with the second named disc; said yieldable means including a head in the bore of said hub outwardly of the adjacent end of the motor shaft, there being an axial socket bore in the shaft open to said end, and a compression spring seated in said socket bore at one end portion and engaging at the other end against such head.

ROBERT G. LE TOURNEAU.

REFERENCES CITED

The following references are of record in the file of this patent:

UNITED STATES PATENTS

| Number | Name | Date |
| --- | --- | --- |
| 339,697 | Roucaglia | Apr. 3, 1886 |
| 688,670 | McGeorge | Dec. 10, 1901 |
| 867,483 | Darlington | Oct. 1, 1907 |
| 1,212,981 | Maris | Jan. 16, 1917 |
| 1,656,174 | Dahl | Jan. 17, 1928 |
| 1,852,574 | Howe | Apr. 5, 1932 |
| 1,884,863 | Remde | Oct. 25, 1932 |
| 1,967,044 | Van Den Eynde | July 17, 1934 |
| 1,968,583 | Apple | July 31, 1934 |
| 2,180,287 | Zwack | Nov. 14, 1939 |
| 2,188,766 | Buckley | Jan. 30, 1940 |
| 2,214,807 | Buckley | Sept. 17, 1940 |
| 2,292,704 | Lillquist | Aug. 11, 1942 |
| 2,302,826 | Wilson | Nov. 24, 1942 |
| 2,368,317 | Meyer et al. | Jan. 30, 1945 |

FOREIGN PATENTS

| Number | Country | Date |
| --- | --- | --- |
| 440,883 | Great Britain | Jan. 2, 1936 |